(12) United States Patent
Lenhert

(10) Patent No.: US 8,128,416 B2
(45) Date of Patent: Mar. 6, 2012

(54) LINEAR MOTION ELECTRICAL CONNECTOR ASSEMBLY

(75) Inventor: Jon M. Lenhert, Brea, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 45 days.

(21) Appl. No.: 12/719,071

(22) Filed: Mar. 8, 2010

(65) Prior Publication Data
US 2010/0240228 A1 Sep. 23, 2010

Related U.S. Application Data

(60) Provisional application No. 61/158,239, filed on Mar. 6, 2009.

(51) Int. Cl.
*H01R 41/00* (2006.01)

(52) U.S. Cl. .......................... 439/32; 439/827

(58) Field of Classification Search ............ 439/23, 439/32, 827, 840, 841, 843, 846
See application file for complete search history.

(56) References Cited

U.S. PATENT DOCUMENTS

| | | | |
|---|---|---|---|
| 3,468,527 A | 9/1969 | Mather | |
| 3,502,784 A | 3/1970 | Kunkel | |
| 3,846,608 A | 11/1974 | Valles | |
| 3,910,566 A * | 10/1975 | Pedersen et al. | 267/167 |
| 4,061,413 A | 12/1977 | Keller | |
| 4,703,133 A * | 10/1987 | Miller | 174/358 |
| 4,731,500 A | 3/1988 | Otsuka | |
| 4,788,381 A | 11/1988 | Nilsson | |
| 4,804,290 A | 2/1989 | Balsells | |
| 4,805,943 A | 2/1989 | Balsells | |
| 4,807,891 A | 2/1989 | Neher | |
| 4,864,076 A | 9/1989 | Stickney | |
| 4,879,434 A | 11/1989 | Assel et al. | |
| 4,890,937 A | 1/1990 | Balsells | |
| 4,906,109 A | 3/1990 | Balsells | |
| 4,968,854 A | 11/1990 | Benn, Sr. et al. | |
| 5,070,216 A | 12/1991 | Thornton | |
| 5,072,070 A | 12/1991 | Balsells | |
| 5,079,388 A | 1/1992 | Balsells | |
| 5,082,390 A | 1/1992 | Balsells | |
| 5,108,078 A | 4/1992 | Balsells | |
| 5,417,595 A | 5/1995 | Cullen et al. | |
| 5,607,006 A * | 3/1997 | Koch | 164/112 |
| 5,807,146 A * | 9/1998 | Baker | 439/827 |
| 5,825,634 A | 10/1998 | Moorehead, Jr. | |
| 6,294,729 B1 | 9/2001 | Kaplo | |

(Continued)

FOREIGN PATENT DOCUMENTS
EP 0427563 A2 5/1991
(Continued)

*Primary Examiner* — Thanh Tam Le
(74) *Attorney, Agent, or Firm* — Abel Law Group, LLP; Chi Suk Kim

(57) ABSTRACT

A linear motion electrical connector includes an outer component having a bore defined by an inner surface and a cylinder within the bore. The cylinder has an outer surface. An annular groove is formed on one of the outer surface of the cylinder or the inner surface of the outer component. The annular groove has an axial length. A conductive spring is fit within the annular groove and provides electrical contact between the outer component and the cylinder. The conductive helical spring is adapted to roll along the axial length of the annular groove to maintain electrical contact when the cylinder is translated relative to the outer component.

28 Claims, 3 Drawing Sheets

U.S. PATENT DOCUMENTS

| | | |
|---|---|---|
| 6,410,846 B1 | 6/2002 | Benn, Jr. |
| 6,423,902 B1 | 7/2002 | Babiel et al. |
| 6,534,706 B1 | 3/2003 | Rapp et al. |
| 6,608,251 B1 | 8/2003 | Nurmi |
| 6,613,976 B1 | 9/2003 | Benn, Jr. |
| 6,639,145 B1 | 10/2003 | Nurmi |
| 6,696,639 B1 | 2/2004 | Nurmi |
| 6,714,423 B1 | 3/2004 | Nurmi |
| 6,749,358 B2 * | 6/2004 | Balsells ..................... 403/316 |
| 7,016,201 B1 | 3/2006 | Ruque |
| 7,074,096 B2 | 7/2006 | Copper et al. |
| 7,601,006 B2 * | 10/2009 | Christoffersen ................ 439/32 |
| 7,914,351 B2 * | 3/2011 | Balsells et al. ................ 439/840 |

FOREIGN PATENT DOCUMENTS

| | | |
|---|---|---|
| KR | 10-0795702 B1 | 1/2008 |

* cited by examiner

LINEAR MOTION ELECTRICAL CONNECTOR ASSEMBLY

CROSS-REFERENCE TO RELATED APPLICATION(S)

The present application claims priority from U.S. Provisional Patent Application No. 61/158,239, filed Mar. 6, 2009, entitled "LINEAR MOTION ELECTRICAL CONNECTOR ASSEMBLY," naming inventor Jon M. Lenhert, which application is incorporated by reference herein in its entirety.

FIELD OF THE DISCLOSURE

The present disclosure relates generally to electrical connectors. More specifically, the present disclosure relates to linear motion electrical connector assemblies.

BACKGROUND

Numerous applications require maintaining an electrical connection while translating one component relative to another. For example, a telescoping antenna requires the electrical connection between the base and the end to be over the entire length of the antenna. One solution is to provide a sliding contact, such as a finger spring, between the two components. However, the finger spring can skip as the segments are translated, resulting in intermittent contact. Additionally, the friction of the sliding contact can produce wear products, such as metal fragments, that can cause the joint to stick. Eventually, wear can result in failure of the finger spring. Another solution is to provide flexible cables between the two components. The flexible cables can provide a constant connection as the components are translated relative one another and do not introduce wear products into the joint. However, flexing of the cables can fatigue the conductor or insulation, resulting in a short or a failure of the electrical connection.

SUMMARY

In an embodiment, a linear motion electrical connector can include an outer component having an inner surface defining a bore and cylinder located within the bore. The cylinder can have an outer surface. Additionally, an annular groove can be formed on one of the inner surface of the outer component or the outer surface of the cylinder. Further, a conductive spring can be fit within the annular groove. The conductive helical spring can provide an electrical contact between the outer component and the cylinder. The conductive helical spring can roll along the length of the groove to maintain the electrical contact when the cylinder and the outer component are translated relative to one another.

In another embodiment, an extendable antenna can include a first antenna segment having a bore defined by an inner surface and a second antenna segment located within the bore. The second antenna segment can have an outer surface. An annular groove can be formed on one of the outer surface of the second antenna segment or the inner surface of the first antenna segment. The annular groove can have an axial length and a conductive spring is fit within the annular groove. The conductive spring can provide electrical contact between the first and second antenna segments. Additionally, the conductive helical spring can be adapted to roll along the axial length of the annular groove to maintain electrical contact when the second antenna segment is translated relative to the first antenna segment.

In a further exemplary embodiment, a robotic system can include a body having a bore defined by an inner surface and a shaft within the bore. The shaft can have an outer surface. An annular groove can be formed on one of the outer surface of the shaft or the inner surface of the body and the annular groove can have an axial length. A conductive spring can be fit within the annular groove and can provide electrical contact between the shaft and the body. Additionally, the conductive helical spring can be adapted to roll along the axial length of the annular groove to maintain electrical contact when the shaft is translated relative to the body.

In yet another exemplary embodiment, a hydraulic system can include a cylinder having a bore defined by an inner surface and a piston within the bore. The piston can have an outer surface. An annular groove can be formed on one of the outer surface of the piston or the inner surface of the cylinder, the annular groove having an axial length. A conductive spring can be fit within the annular groove and can provide electrical contact between the cylinder and the piston. Additionally, the conductive helical spring can be adapted to roll along the axial length of the annular groove to maintain electrical contact when the piston is translated relative to the cylinder.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
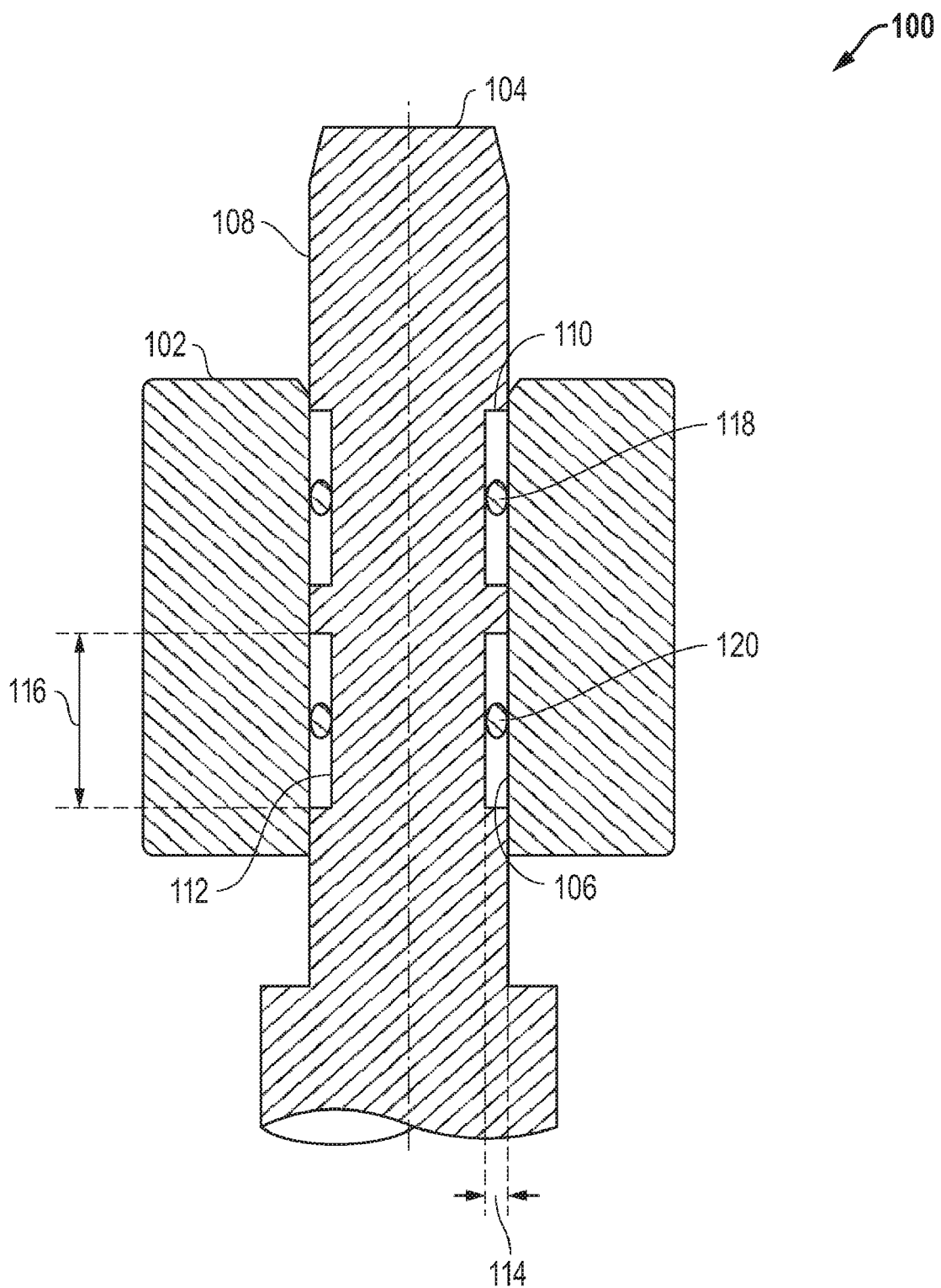
FIG. 1 is a diagram illustrating an exemplary embodiment of a linear motion electrical connector.

FIG. 1 illustrates an exemplary embodiment of a linear motion electrical connector, generally designated 100. The linear motion electrical connector 100 can include an outer component 102 and a cylinder 104. The outer component 102 can have an inner surface 106 defining a bore and the cylinder 104 can have an outer surface 108. The cylinder 104 can be sized to slidingly fit inside the bore of the outer component 102. In an embodiment, the cylinder 104 may be sized so that there is minimal contact between the outer surface 108 of the cylinder 104 and the inner surface 106 of the outer component 102 when the cylinder 104 is centered and aligned within the bore. The cylinder 104 and the outer component 102 can be translated relative to one another over a stroke length.

Further, annular grooves 110 and 112 can be formed on the outer surface 108 of the cylinder 104. In an embodiment, the annular grooves 110 can have a rectangular cross section with a depth 114 and an axial length 116. In alternate embodiments, there can be one or more annular grooves. Generally, the number of annular grooves can be less than the ratio of the length of the bore to the stroke length, such that the annular grooves are non-overlapping. The stroke length can be the full extent of the translation of the linear motion electrical connector during normal operation. Additionally, the annular grooves can be placed along the bore length to maintain the cylinder 104 in a centered and aligned position with respect to the bore.

Rolling springs 118 and 120 can be placed within the annular grooves 110 and 112. In an embodiment, the rolling springs 118 and 120 can be an overlapping helical coil spring, described in more detail below. In an alternate embodiment, other forms of rolling springs can be used. For example a non-overlapping helical coil spring as described in U.S. Pat. No. 3,502,784 to Kunkel or a canted coil spring as described in U.S. Pat. No. 3,468,527 to Mather.

During operation of the linear motion electrical connector, the cylinder 104 and the outer component 102 can be linearly translated relative to one another. An electrical connection between the cylinder 104 and the outer component 102 can be maintained during translation. The rolling springs 118 and 120 can roll along the annular groove 110 and 112. As the rolling springs 118 and 120 roll, the sliding friction between the cylinder 104 and the outer component 102 can be significantly reduced.

Figure 2:
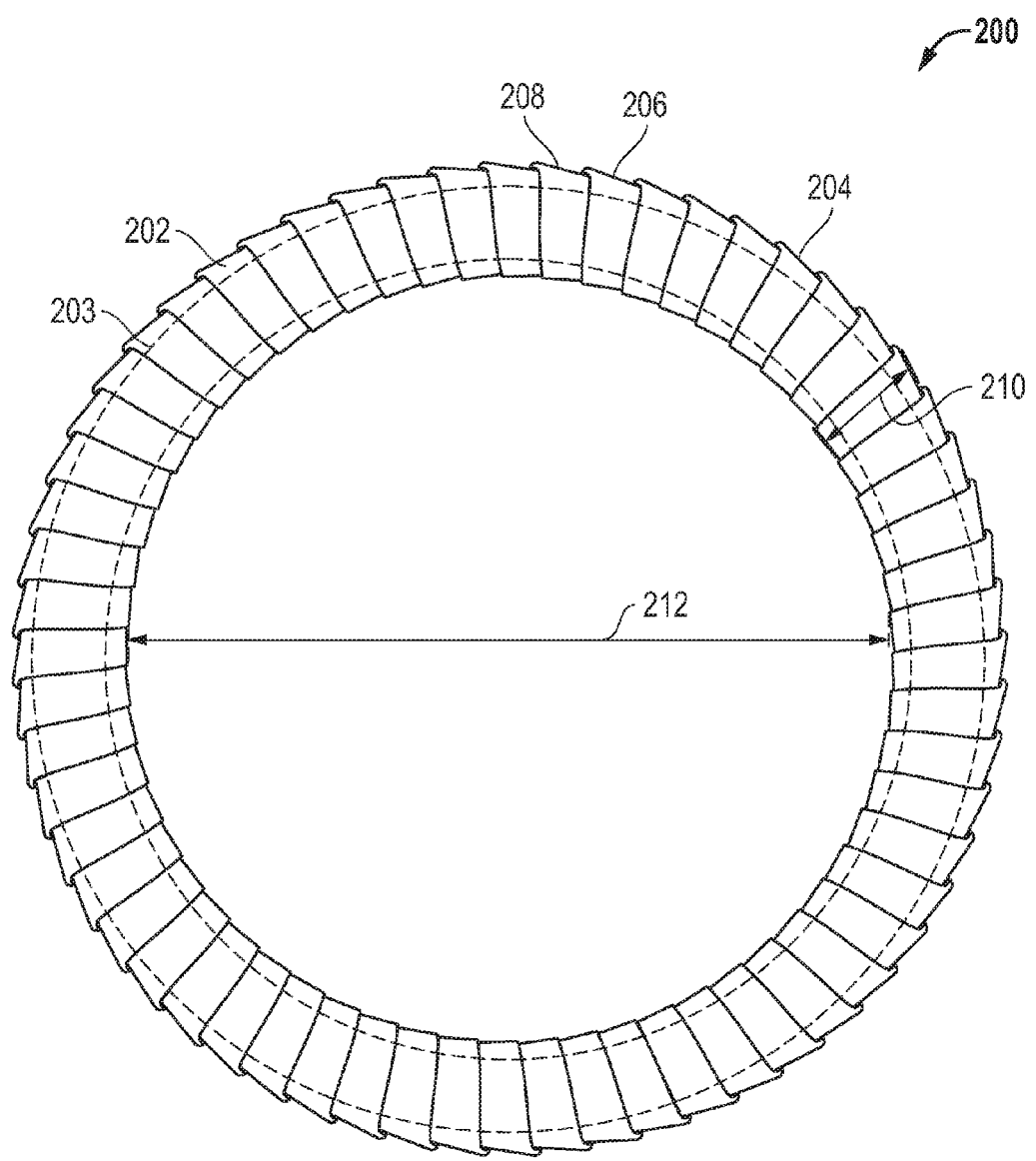
FIG. 2 is a diagram illustrating an exemplary embodiment of a rolling spring.

FIG. 2 illustrates an exemplary rolling spring, generally designated 200. Rolling spring 200 is can be formed by coiling a conductive ribbon 202 in an overlapping helical coil 204. The conductive ribbon 202 can have a width of between about 0.060 inches and about 0.300 inches and a thickness of between about 0.003 inches and about 0.006 inches. Each winding of the helical coil 204 can overlap the preceding winding of the helical coil 204 with an overlap distance. For example, winding 206 overlaps the preceding winding 208. The overlap distance can be between about 20% and about 40% of the width of the conductive ribbon 202. The overlapping helical coil 204 can have a coil diameter 210. The coil diameter 210 can be less than about three times the width of the conductive ribbon 202, such as between about 0.060 inches and about 0.250 inches. Additionally, the overlapping helical coil 204 can be curved and the ends of the conductive ribbon 202 bonded together, such as by welding, to form the rolling spring 200 having an annular shape. In an alternate embodiment, a solid ring 203 (shown in phantom) can be located within the overlapping helical coil. The rolling spring 200 can have an inner diameter 212. The inner diameter of the rolling spring 200 can be not less than about eight times a coil diameter 210.

In an embodiment, the conductive ribbon 202 can include a metal or a metal alloy. For example, the conductive ribbon 202 can include a nickel alloy such as hastelloy, Ni220, and Phynox, a copper alloy such as beryllium copper and copper-chromium-zinc alloy, or stainless steel. Additionally, the metal ribbon can be plated with a plating metal, such as gold, tin, nickel, or silver. In an alternate embodiment, the conductive ribbon can be formed of a polymer, such as a conductive polymer or a polymer coated in the plating metal. In an embodiment, the conductive polymer can be a polymer having a conductive filler.

In an embodiment, the inner diameter 212 of the rolling spring 200 can be related to diameter of the cylinder at the location of the annular groove, such that there is even contact between the rolling spring 200 and the outer surface of the cylinder. Additionally, the coil diameter 210 can be related to the depth of the annular groove. Specifically, under moderate compressive force, the outer edge of the rolling spring 200 maintains an even contact with the inner surface of the outer component. Additionally, under moderate compressive force, the overlapping helical coil can maintain a substantially circular cross section. The moderate compressive force can result in a cross-diametric compression of the spring of not greater than about 25% of the coil diameter, such as not greater than 20% of the coil diameter, even not greater than 15% of the coil diameter. In an embodiment, cross-diametric compression of the spring resulting in at least about 10% of the coil diameter is desirable to maintain a suitable electrical contact. In another embodiment, the spring can have a solid metal ring located within the helical coil. The solid metal ring can substantially limit further the compression of the spring under heavy side loads.

Figure 3:
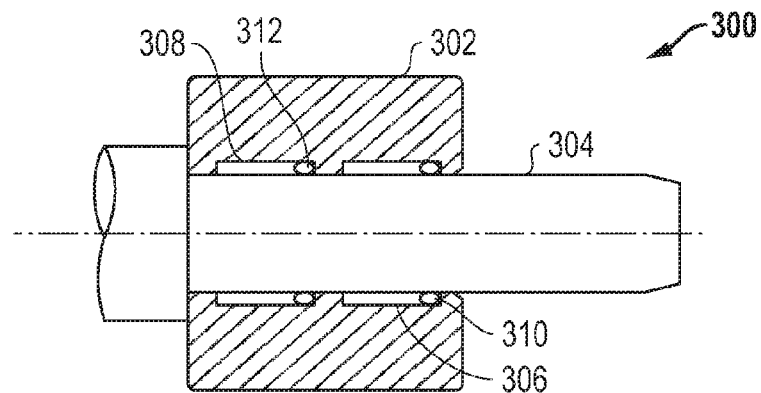
FIGS. 3-5 are diagrams illustrating another exemplary embodiment of a linear motion electrical connector.
Figure 4:
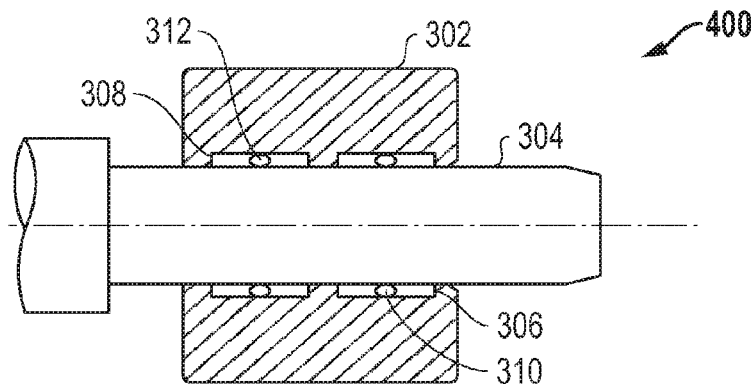
Figure 5:
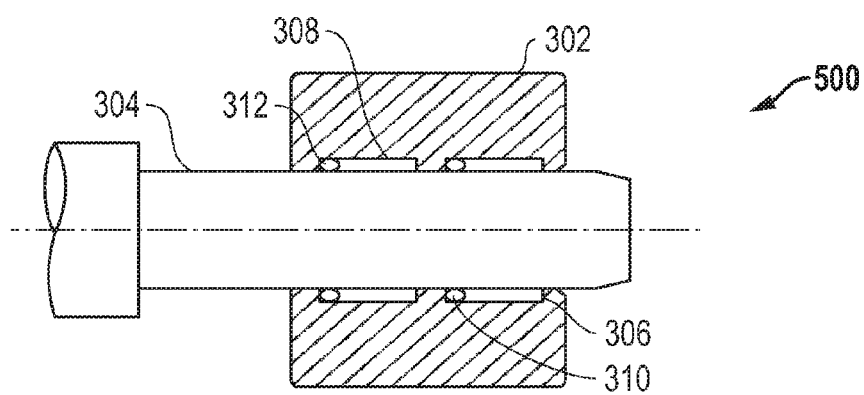

Turning to FIGS. 3-5, another embodiment of the linear motion electrical connector is illustrated, generally designated 300. Referring to FIG. 3, cylinder 304 is located within outer component 302. Additionally, outer component 302 can include annular grooves 306 and 308. Rolling springs 310 and 312 can be located within each of the annular grooves.

When the cylinder 304 is fully inserted into the outer component 302 as shown in FIG. 3, the rolling springs 310 and 312 can be located at a first end of the annular grooves 306 and 308. As the cylinder 304 is translated relative to the outer component 302 to a position shown in FIG. 4, the rolling springs 310 and 312 move along the outer surface of the cylinder 304 and within annular grooves 306 and 308 in a direction parallel to the axis of the cylinder 304 by rolling. The movement along the outer surface of the cylinder 304 can be accomplished by each rolling spring 310 and 310 rolling around a respective coil-axis defined by the center points of each winding of the spring. Further translation of the cylinder 304 over the remainder of the stroke length results in the rolling springs 310 and 312 rolling to a second end of the annular grooves 306 and 308, as shown in FIG. 5. The stroke length is illustrated by the difference between the position shown in FIG. 3 and the position shown in FIG. 5.

Generally, the rolling springs 310 and 312 can act to maintain the cylinder 304 in a centered alignment within the bore of the outer component 302. The centered alignment can substantially reduce friction between the inner surface of the outer component 302 and the outer surface of the cylinder 304. Additionally, the rolling of the springs 310 and 312 can prevent sliding friction of the springs 310 and 312 against either the inner surface or the outer surface. Generally, any rolling friction of the rolling springs 310 and 312 can be significantly less than the sliding friction of the springs 310 and 312. Thus, the rolling springs 310 and 312 can act to reduce the overall friction of the linear motion electrical connector 300. The reduced friction can reduce wear and extend the life of the linear motion electrical connector 300.

The linear motion electrical connector can be used in a variety of applications where an electrical connection needs to be maintained across a linear motion joint. For example, the linear motion electrical connection can be used in an extendable antenna to provide a continuous electrical connection over the full range of extension of the antenna. In another example, the linear motion electrical connector can be used in a robotic system. In yet another example, the linear motion electrical connector can be integrated into a hydraulic piston to provide a connection through the piston.

In an embodiment, the linear motion electrical can be used to provide a current path for grounding, such as to limit damage from an electrical strike or another electrical discharge. In another embodiment, the linear motion electrical connector can be used to provide an electrical path from a power source. For example, a DC or AC current can be passed through the linear motion electrical connector to provide power to a device. In yet another embodiment, a control signal can be provide from a control system through the linear motion electrical to a device.

What is claimed is:

1. A linear motion electrical connector comprising:
   an outer component having a bore defined by an inner surface;

a cylinder within the bore, the cylinder having an outer surface, an annular groove formed on only one of the outer surface of the cylinder or the inner surface of the outer component, the annular groove having an axial length; and a conductive spring configured to move axially within the annular groove, the conductive spring providing electrical contact between the outer component and the cylinder, wherein the conductive spring is adapted to roll along the axial length of the annular groove to maintain electrical contact when the cylinder is translated relative to the outer component.

2. The linear motion electrical connector of claim 1, wherein the annular groove has a rectangular cross section and the conductive spring moves axially between axial ends of the annular groove.

3. The linear motion electrical connector of claim 1, wherein the cylinder is translated relative to the outer component over a stroke length.

4. The linear motion electrical connector of claim 3, wherein the axial length is not less than the stroke length.

5. The linear motion electrical connector of claim 1, wherein the annular groove has a depth of not less than 65% of a coil diameter of the conductive spring.

6. The linear motion electrical connector of claim 5, wherein the depth is not greater than the coil diameter.

7. The linear motion electrical connector of claim 6, wherein the depth is not greater than 95% of the coil diameter.

8. The linear motion electrical connector of claim 7, wherein the depth is not greater than 90% of the coil diameter.

9. The linear motion electrical connector of claim 1, wherein the conductive spring includes a conductive ribbon that is helical.

10. The linear motion electrical connector of claim 9, wherein conductive ribbon has a width of between about 0.060 inches and about 0.300 inches.

11. The linear motion electrical connector of claim 10, wherein the conductive ribbon has a coil diameter less than about three times the width of the conductive ribbon.

12. The linear motion electrical connector of claim 11, wherein the coil diameter is between about 0.060 inches and about 0.250 inches.

13. The linear motion electrical connector of claim 9, wherein conductive ribbon has a thickness of between about 0.003 inches and about 0.006 inches.

14. The linear motion electrical connector of claim 9, wherein the conductive ribbon is formed into an overlapping helical coil.

15. The linear motion electrical connector of claim 14, wherein the overlapping helical coil has an overlap distance of between about 20% and about 40% of the width.

16. The linear motion electrical connector of claim 14, wherein the conductive helical spring includes a solid ring located within the overlapping helical coil.

17. A linear motion electrical connector comprising:
an outer component having an inner surface defining a bore;
a cylinder within the bore, the cylinder having an outer surface with an annular groove formed thereon, the annular groove having an axial length and axial ends; and a conductive spring formed in an annular shape and fit within the groove, the conductive spring having a diameter that is less than the axial length such that the conductive spring is configured to travel axially between the axial ends of the annular groove, and the conductive spring provides electrical contact between the bore and the cylinder, wherein the conductive spring is adapted to roll along the axial length of the groove to maintain electrical contact when the cylinder is translated relative to the bore over a stroke length.

18. The linear motion electrical connector of claim 17, wherein the conductive spring is in the form of a helix with a plurality of windings.

19. The linear motion electrical connector of claim 17, wherein the conductive spring is a closed loop having an annular shape.

20. The linear motion electrical connector of claim 17, wherein the bore has a bore length, and the number of annular grooves is less than the ratio of the bore length to the stroke length.

21. The linear motion electrical connector of claim 20, wherein the annular grooves are distributed along the bore length.

22. The linear motion electrical connector of claim 17, wherein the conductive spring includes a conductive ribbon.

23. The linear motion electrical connector of claim 22, wherein the conductive ribbon is formed into an overlapping helical coil.

24. The linear motion electrical connector of claim 17, wherein the conductive spring is formed of a metal or metal alloy.

25. The linear motion electrical connector of claim 17, wherein the conductive spring is plated with a plating metal.

26. A linear motion electrical connector comprising:
an outer component having an inner surface and an annular groove formed thereon, the inner surface defining a bore, the annular groove having an axial length and axial ends;
a cylinder within the bore; and
a conductive helical spring comprising an overlapping helical coil, formed in an annular shape and fit within the annular groove, the conductive spring having a diameter that is less than the axial length such that the conductive helical spring is configured to travel axially between the axial ends of the annular groove, and the conductive helical spring providing electrical contact between the outer component and the cylinder,
wherein the conductive spring is adapted to roll along the axial length of the annular groove to maintain the electrical contact when the cylinder is translated relative to the outer component.

27. The linear motion electrical connector of claim 26, wherein the conductive helical spring includes a conductive ribbon.

28. The linear motion electrical connector of claim 27, wherein the conductive ribbon includes first and second ends welded together.

* * * * *